E. H. Ewell,
Lath Machine.

No. 95,888.      Patented Oct. 19, 1869.

Witnesses,
James Thierry
H. T. Eberts

Inventor
E. H. Ewell
Per Attorney
Thos. S. Sprague

United States Patent Office.

ERVIN H. EWELL, OF ST. LOUIS, MICHIGAN.

Letters Patent No. 95,888, dated October 19, 1869.

IMPROVEMENT IN MACHINE FOR SAWING LATH.

The Schedule referred to in these Letters Patent and making part of the same.

*To whom it may concern:*

Be it known that I, ERVIN H. EWELL, of St. Louis, in the county of Gratiot, and State of Michigan, have invented a new and useful Improvement in Lath-Sawing Machines; and I do declare that the following is a true and accurate description thereof, reference being had to the accompanying drawings, and to the letters of reference marked thereon, and being a part of this specification, in which—

Similar letters of reference indicate like parts in each figure.

Figure 2:
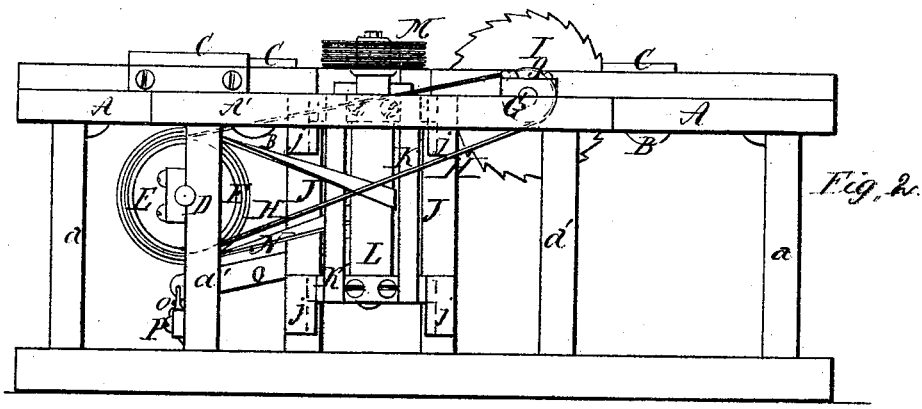
Figure 2 is the same, from the rear side.
Figure 1:
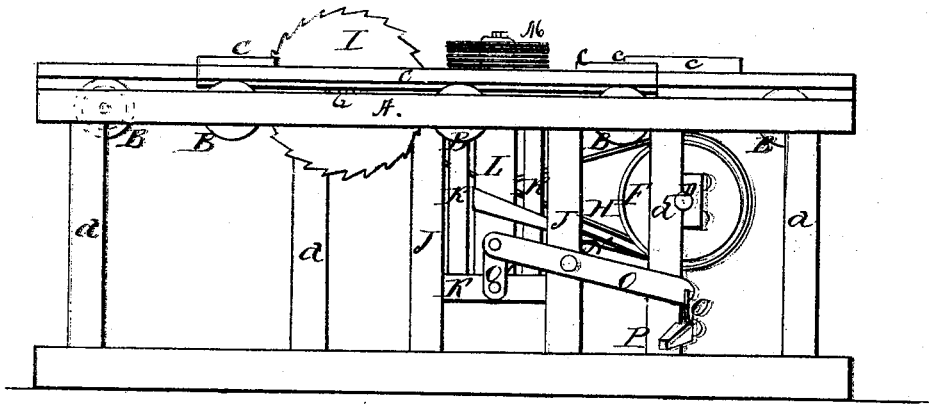
Figure 1 is an elevation of the front side of my machine.

The nature of this invention relates to an improved construction of machines for sawing lath, and other like material, from planks, slabs, or edgings of refuse timber, large quantities of which are produced in saw-mills, in the manufacture of lumber.

It consists in a series of circular saws, horizontally secured, with proper spaces between them, on a vertical mandrel, for splitting the timber to the thickness of the lath to be produced; and in a bolting-saw, rotating with a horizontal arbor, for sawing the lath to the proper width, the whole arranged in a proper frame, so that both saw-arbors are driven from one shaft, by means of proper belts, as hereinafter more fully shown and set forth.

In the drawings—

A A' represent a T-shaped frame, supported by proper legs, *a a'*.

In the frame A are journalled rollers B, carrying the sliding saw-table C.

Journalled in proper bearings, in one pair of the legs *a'*, is a driving-shaft, D, carrying the driving-pulleys E and F.

Journalled in the frame A A', is a horizontal arbor, G, provided with a proper pulley, *g*, which is rotated by a belt, H, from the pulley E.

On the front end of the arbor is hung a circular saw, I. The office of this saw is to hold the split laths to their proper widths. For this purpose a gauge, *c*, is secured to the saw-table, as shown.

Pendent from the rear side of the main frame A are legs or standards, J, provided with vertical guides, *j*, on which plays freely a frame, K. In this frame is journalled a mandrel, L, carrying at its top a gang of circular saws, M, between each pair of which a collar, of the thickness of the intended lath, is placed, and the whole securely fastened in place by a screw-collar, as shown.

The mandrel L is driven by a belt, N, making a quarter turn from the pulley E, as shown in fig. 2 of the drawings.

O is a lever, pivoted to one of the standards J, and is connected at either end to the sliding frame K and a treadle P, by links *o c'*. The treadle is held down, to raise the saws M above the plane of the saw-table, by a gain or notch cut into one of the supports *a'*, into which it enters. Releasing the treadle from the notch, the frame K will drop, and carry the saws below the plane of the saw-table, a recess being therein provided for their reception.

Any equivalent device, other than the one shown, may be employed to raise and lower the frame.

To operate the machine, power is applied to the shaft D, which will cause the saws to rotate at the proper speed. Bolts of edgings, slabs, or plank, cut to the proper length, are then placed, one at a time, on the saw-table C. If the edge is not square, drop the saws M, with their mandrel, and move the table C along until the saw I takes an edging from the slab, then return the table, raise the saws M into position, move the slab back until it is stopped by the gauge *c;* then move the saw-table forward, when the saws M will cut into the edge of the slab a series of kerfs, leaving the thickness of a lath between each kerf and the next. Continuing, the saw I cuts off the laths, which fall to the rear of the frame, repeating the operation until the slab is converted into lath.

The device is equally well adapted to the getting out of fence-pickets, chair-stuff, and other like articles, by simply changing the size of collars between the saws M, and setting the gauge *c* to the width of the article required.

I am aware of the invention of Francis Shuman, of a lath-machine, for which he obtained Letters Patent of the United States, October 31, 1832, and I hereby disclaim the same, and every part thereof.

What I claim as my invention, and desire to secure by Letters Patent, is—

The devices by which the gang of saws M is adjustable vertically above and below the surface of the saw-table C, consisting of the mandrel L, the frame K, the slides *f*, the lever O, and the treadle P, when constructed and arranged as above set forth.

ERVIN H. EWELL.

Witnesses:
H. F. EBERTS,
JAS. I. DAY.